(12) United States Patent
Harjani

(10) Patent No.: US 8,028,891 B2
(45) Date of Patent: Oct. 4, 2011

(54) SYSTEM AND METHOD FOR AUTHENTICATING AND TRACKING PRODUCTS

(76) Inventor: Lokesh Prem Harjani, Mumbai (IN)

( * ) Notice: Subject to any disclaimer, the term of this patent is extended or adjusted under 35 U.S.C. 154(b) by 696 days.

(21) Appl. No.: 12/011,416

(22) Filed: Jan. 24, 2008

(65) Prior Publication Data

US 2008/0179390 A1   Jul. 31, 2008

(30) Foreign Application Priority Data

Jan. 25, 2007   (IN) .......................... 147/MUM/2007

(51) Int. Cl.
*G06F 17/00*   (2006.01)
(52) U.S. Cl. ....................... 235/375; 235/385
(58) Field of Classification Search .................. 235/385, 235/375
See application file for complete search history.

(56) References Cited

U.S. PATENT DOCUMENTS

| | | | | |
|---|---|---|---|---|
| 4,463,250 A | * | 7/1984 | McNeight et al. | 235/385 |
| 4,651,150 A | * | 3/1987 | Katz et al. | 340/5.86 |
| 5,768,384 A | * | 6/1998 | Berson | 705/50 |
| 6,996,543 B1 | * | 2/2006 | Coppersmith et al. | 705/50 |
| 7,614,546 B2 | * | 11/2009 | Grant et al. | 235/375 |

* cited by examiner

*Primary Examiner* — Jamara Franklin
(74) *Attorney, Agent, or Firm* — Donald R. Boys; Central Coast Patent Agency, Inc.

(57) ABSTRACT

The embodiments herein provide an authentication and tracking and retail analytics system. The system comprises of code generation module, a database server, an authentication module and a communication channel. A code generation module generates unique authentication code. This unique authentication code is printed/labeled on the product. Label/tag that is marked or contains a hidden code is placed on a product requiring verification. In order to verify the product, the consumer or retailer defaces or scratches a portion of the label/tag and reveals its hidden code. Consumer or retailer sends the product authentication code to a specified number mentioned via any communication device capable of sending and receiving SMS/MMS/picture/graphics. The verification software decrypts the encrypted authenticated code and compares decrypted code with the original data assigned for the code to determine an authenticity of the product and sends reply message to the consumer or retailer.

14 Claims, 2 Drawing Sheets

SYSTEM AND METHOD FOR AUTHENTICATING AND TRACKING PRODUCTS

BACKGROUND

1. Technical Field

The embodiments herein generally relate to a system and method for anti-counterfeiting, authentication and tracking process and more specifically system and method to anti-counterfeiting and goods tracking process between brand owner/manufacturer through supply chain to retailer and ultimately, the consumer. The embodiments also relate to retail analysis method.

2. Description of the Related Art

Counterfeiting and illegal transsshipping of goods is an economic and social menace and over the years this has grown into a well-organized criminal activity in most of the countries. Manufacturers and suppliers are increasingly encountering an unauthorized distribution practice known as transshipping. Transshipping is an industry wide problem. Often manufacturer or brand owners want to establish their presence in the new and emerging markets and they sell their products at reduced prices. Products are sometimes sold at a discounted price to government agencies, nonprofit entities, or national accounts serviced by local distributors. Sometimes distributor or an enterprising third party discovers the price discrepancy and sell these discounted products to other territories/regions at higher cost where large profit margin exists. Transshipping destroys manufacturer's potential market and manufacturer losses their credibility. When products are dispersed through unauthorized distribution lines, it becomes difficult for the manufacturer to trace the product. If the product cannot be traced, defending products liability actions is more difficult. So tracking of goods and products becomes very important to prevent transshipping.

Also, increased counterfeiting activities and complex supply chains have compounded the urgency to invent effective method and technology to combat the growing global problem of counterfeiting through better product tracking and management. Every brand today faces serious threat from unauthorized or spurious products' infringement. The onus lies on the brand to protect itself and verify the delivery of the actual quality of goods it is known for to the market and consumer. This task is often unmanageable in the current global business scenario due to complex ordering, shipping, and distribution channels where more often than not, the actual brand has no direct link to the end consumer.

Many attempts have been made to reduce the problem of counterfeiting and illegal transsshipping while trying to make product tracking more efficient. Most of the methods involve measures such as alteration to product packaging, the use of special marking inks, holograms, RFID, smart tags and the like; all tactics which may easily be duplicated, do not offer multiple point authentication checks, have low accuracy rates, are cost prohibitive, are unable to be easily implemented in existing supply chains, do not offer real time and immediate validation ability, and are not easily readable/recognizable/usable/verifiable by a ordinary means.

Therefore there exists a need for method and system for anti-counterfeiting and goods tracking which is robust, yet simple and unique in distinguishing authentic from counterfeit in the supply chain and market.

In today's competitive industry manufacturers, suppliers and retailers need as much business support as they can get when deciding where to operate, what they should stock, which customers they should fight to retain, and how to communicate with them. Manufacturers and suppliers today want to analyze the enormous amount of retail related data in order to understand the business performance and hence take informed business decisions. Data related to demographic and expenditure variables are ideal anchors for trend analysis. Trend analysis uses historical data to make accurate predictions about future spending-in terms of amounts, categories and brands. Retail analytics optimizes returns and profits in the areas like marketing and sales, operations, logistics, merchandising. Quantitative information helps manufacturers, suppliers and retailers to understand their customer potential and improves marketing, sales and targeting strategies.

Hence there is further need to develop a method for retail analytics that enable today's global manufacturers, suppliers and retailers to make smarter decisions and manage their businesses more effectively.

SUMMARY

Primary object of the embodiments is to provide system and method to automate anti-counterfeiting and goods tracking process.

Another object of the embodiments is to provide method for retail analytics that enables today's global manufacturers, suppliers and retailers to make smarter decisions and manage their businesses more effectively.

Yet another objective of the embodiments is to provide fraud prevention and product authentication system.

In view of the foregoing, the embodiments herein provide a retail analytics system and process to automate anti-counterfeiting and goods tracking process.

Retail analytics and anti-counterfeiting system is a unique and user-friendly system by which manufacturer, suppliers and retailer can get business related data in order to understand their customer potential and improves marketing, sales and targeting strategies. The system also helps companies encountering fraudulent activities to verify their brand's authenticity directly to distributor, retailer and end consumer in real-time through Short Message Service (SMS), Multimedia Messaging Service (MMS) or any Web based protocol.

For generation of set of the product authentication codes, manufacturer sends the request to service provider. Product authentication code can be customized according to choice of the manufacturer and product. A master batch code is assigned to the manufacturer for the generated set of product authentication codes. Once the manufacturer sends registration request with the help of master batch code to database server, the set of product authentication codes become active.

Each product has a unique code printed/labeled on it. A label/tag that is marked or contains a hidden code is placed on a product requiring verification. The consumer/retailer defaces or scratches a portion of the label/tag in order to reveal its hidden code. Code can be picture code, bar code, voice code, semacode, alphanumeric codes or combination of these codes. The code can then be sent via any communication device capable of sending and receiving SMS/MMS/Picture/Graphics (all global network formats) to a specified number. The code will be processed by a unique software system and consumer or retailer will receive a reply validation indicating the goods are authentic or otherwise. Consumers can be rest assured that a branded product is genuine since each product is marked with a unique code; retailers can verify that suppliers and distribution agents they purchase from are indeed providing legitimate goods with every shipment.

Once a code is verified, the software engine moves the code from the list of "active" or "live" codes on the database to an "used" or "already activated" code list on the database, so if the same code is input again, a reply message stating that the code has already been verified/authenticated will be generated. Therefore, if the consumer does not make the original entry of code, then there is a strong possibility that the goods are counterfeit or have been tampered. Additionally, any tampering of the sealed label/tag is further proof of product tampering. False codes which are entered and do not match either "live" or "used" codes on the database will be returned with an "authentication failed" message.

The system is multi-faceted and able to not only track, but detect where fraudulent goods may have entered the supply chain from manufacturing facility to retail or consumer level. The authentication software system can detect and trace trans-shipped or legitimate goods being sold in markets they were not intended for. Users may validate the product/good by simple means through any communication device capable of sending the authentication code.

With the help of the data related to demographic and expenditure variables manufacturer do trend analysis. Trend analysis uses historical data to make accurate predictions about future spending-in terms of amounts, categories, even brands. Retail analytics optimizes returns and profits in the areas like marketing and sales, operations, logistics, merchandising. Quantitative information helps manufacturers, suppliers and retailers to understand their customer potential and improves marketing, sales and targeting strategies.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
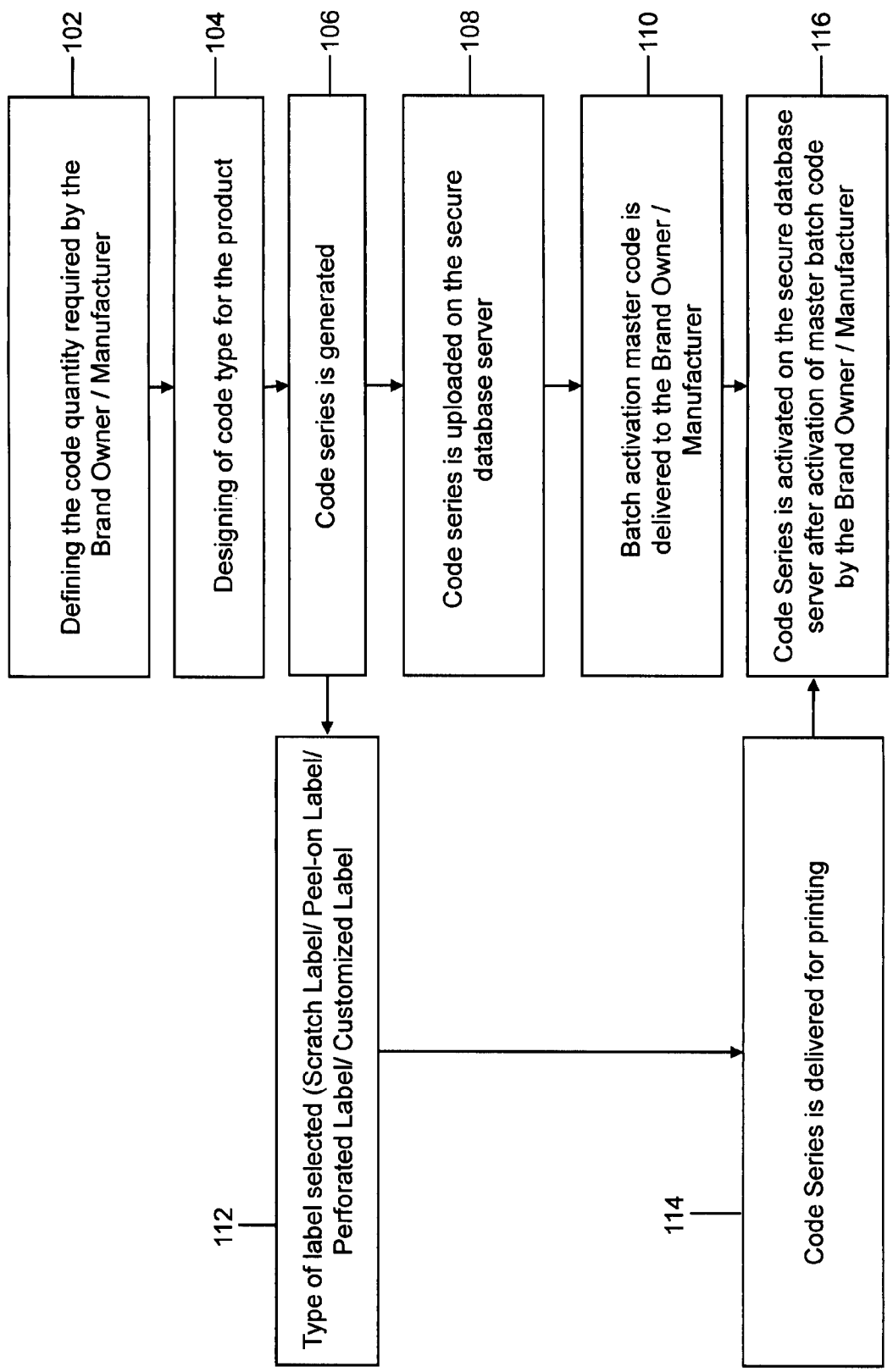
FIG. 1 illustrates code generation, label printing, code printing on label and batch activation process flow chart according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned there remains a need to develop an authentication and tracking system. There further need to develop a method for conducting retail analytics.

According to an embodiment of system comprises of code generation module, a database server, an authentication module and a communication channel. A code generation module generates unique authentication code. This unique authentication code is printed/labeled on the product. Label/tag that is marked or contains a hidden code is placed on a product requiring verification. For generation of set of the product authentication codes, manufacturer sends the request to service provider. Product authentication code can be customized according to choice of the manufacturer and product. A master batch code is assigned to the manufacturer for the generated set of product authentication codes. Once the manufacturer sends registration request with the help of master batch code to database server, the set of product authentication codes become active. The database server comprises of complete information of the product and verification software for verification of product.

In order to verify the product, the consumer or retailer defaces or scratches a portion of the label/tag and reveals its hidden code. Authentication code can be picture code, bar code, semacode, voice code, alphanumeric codes or combination of these codes depending on choice of manufacturer/brand owner. Consumer or retailer sends the product authentication code to a specified number mentioned via any communication device capable of sending and receiving SMS/MMS/picture/graphics. Authentication module verifies the code and processes with the help of a software system. The verification software decrypts the encrypted authenticated code and compares decrypted code with the original data assigned for the code to determine an authenticity of the product. Consumer or retailer receives a reply validation indicating the goods are authentic or otherwise in form of message. Consumers can be rest assured that a branded product is genuine since each product is marked with a unique code; retailers can verify that suppliers and distribution agents they purchase from are indeed providing legitimate goods with every shipment. Once a code is verified, the software engine moves the code from the list of "active" or "live" codes on the database to an "used" or "already activated" code list on the database, so if the same code is input again, a reply message stating that the code has already been verified/authenticated will be generated. If the consumer does not make the original entry of code, then there is a strong possibility that the goods are counterfeit or have been tampered. Additionally, any tampering of the sealed label/tag would be further proof of product tampering. False codes which are entered and do not match either "live" or "used" codes on the database will be returned with an "authentication failed" message. The authentication code contains information including routing information, place of delivery, details of the product, manufacturing details, and warranty information.

According to another embodiment, the system is capable of detecting where fraudulent goods may have entered the supply chain from manufacturing facility to retail or consumer level. The software system can also detect and trace trans-shipped or legitimate goods being sold in markets they were not intended for. Users may validate the product/good by simple means, either through any communication device capable of sending the authentication code.

Through the authentication module, system stores information like data of product sold, place of the product sold and number of product sold. With the help of this data related to demographic and other variables manufacturer can various analysis and make accurate predictions about future spending-in terms of amounts, categories brands. Retail analytics optimizes returns and profits in the areas like marketing and sales, operations, logistics, merchandising. Quantitative information helps manufacturers, suppliers and retailers to understand their customer potential and improves marketing, sales and targeting strategies.

FIG. 1 illustrates code generation, label printing, code printing on label and batch activation process flow chart according to an embodiment. For generation of set of the product authentication codes, manufacturer sends the request to service provider and provides details and quantity of authentication code (102). Product authentication code is customized according to choice of the manufacturer/brand owner (104). Authentication code can be picture code, bar code, semacode, voice code, alphanumeric codes or combination of these codes. Once the code series is generated (106), it is uploaded on the secure database server (108). A master batch code is assigned to the manufacturer for the generated set of product authentication codes and is sent to the manufacture/brand owner (110). The unique authentication code is printed/labeled on the product. Label/tag that is selected by brand owner/manufacturer (112). The label/tag can be scratch label, peel-on label, perforated label or any other customized label. Code Series is delivered for printing (114). Once the manufacturer sends registration request with the help of master batch code to database server, the set of product authentication codes become active (116).

Figure 2:
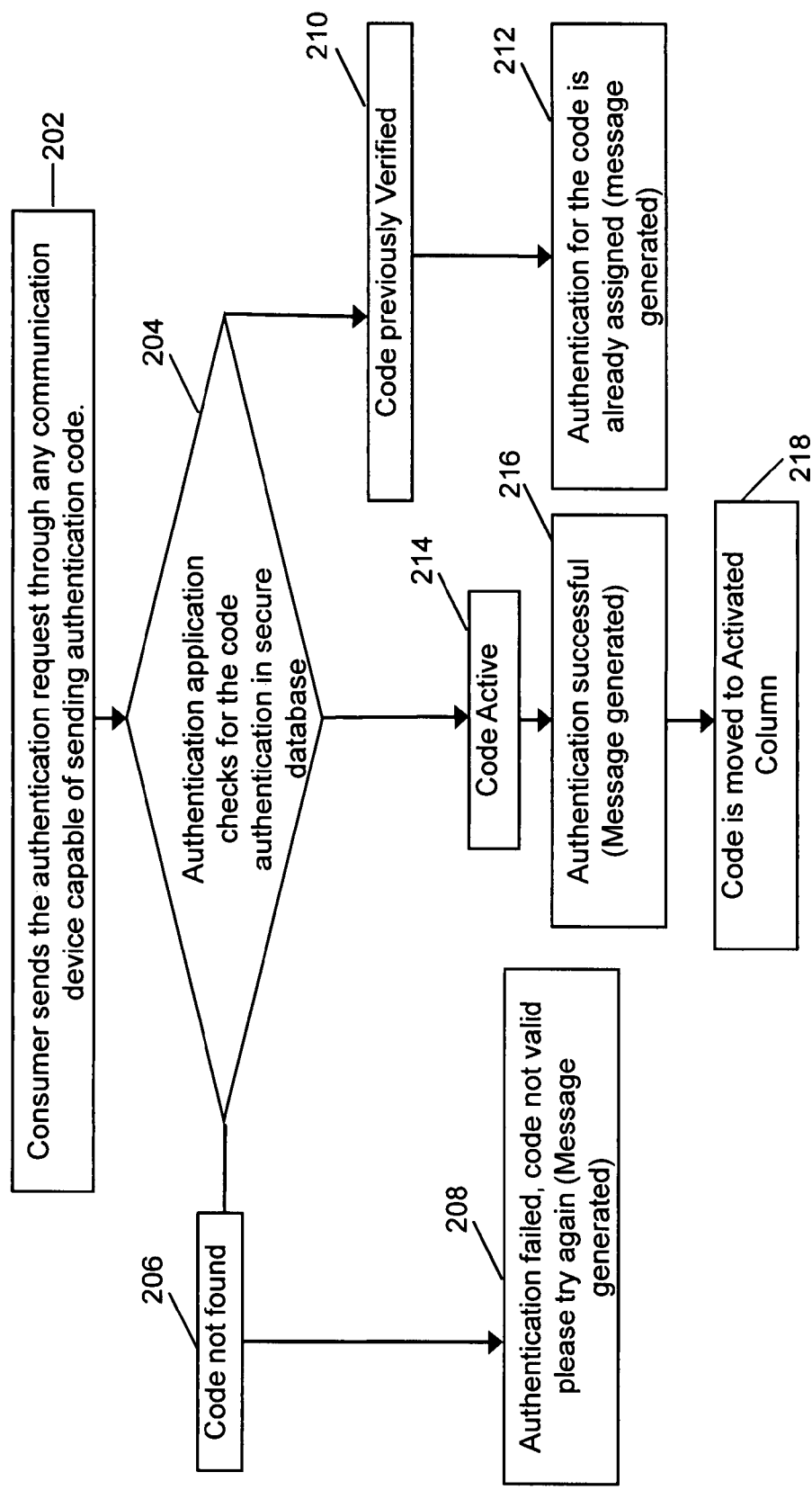
FIG. 2 illustrates a flowchart explaining the process of code validation according to an embodiment.

FIG. 2 illustrates a flowchart explaining the process of code validation according to an embodiment. In order to verify the product, the consumer or retailer defaces or scratches a portion of the label/tag and reveals its hidden code. Consumer or retailer sends the product authentication code to a specified number mentioned via any communication device capable of sending and receiving SMS/MMS/Picture/Graphics (202). Authentication module verifies the code and processes it with the help of a software system. The verification software decrypts the encrypted authenticated code and compares decrypted code with the original data assigned for the code to determine an authenticity of the product (204). If retailers or consumer send wrong code (206), authentication software sends back "Authentication Failed—Code not valid" message to the consumer or retailer (208). If sent code has been previously verified (210), authentication software send back "Authentication Failed—Authentication for the code is already assigned" message to the consumer or retailer (212). If code is active (214), consumer or retailer receives "Authentication Successful" reply message indicating the product is authentic (216). Consumer or retailer can be rest assured that a branded product is genuine since each product is marked with a unique code; retailers can verify that suppliers and distribution agents they purchase from are indeed providing legitimate goods with every shipment. Once a code is verified, the software engine moves the code from the list of "active" or "live" codes on the database to an "used" or "already activated" code list on the database (218). If the same code is input again, a reply message stating that the code has already been verified/authenticated will be generated.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An authentication and tracking system, comprising:
a network-connected server having a communication interface to individual ones of a plurality of manufacturers of articles and
software executing on the server from a machine-readable physical media, the software providing:
functionality enabling receipt of a request for authentication codes from an individual one of the plurality of manufacturers via the communication interface, the request specifying quantity of authentication codes to generate and information regarding the articles for which the authentication codes will be used, and assigning and associating a master batch code;
functionality enabling generating the quantity of authentication codes associated with the master batch code, the generated authentication codes comprising the information regarding the articles for which the codes will be used; and
functionality for transmitting the generated authentication codes to the individual manufacturer to be applied to the articles, wherein the codes generated associated with a master batch code are maintained as inactive until a further request from the individual manufacturer is received, the request including the associated master batch code, wherein the codes are made active; and
functionality for verifying authentication codes received in requests for verification from third parties who have received articles bearing the authentication codes, the articles having originated from the individual manufacturer.

2. The system according to claim 1, wherein the functionality for generating authentication codes can generate picture code, Semacodes, voice code, barcodes or alpha-numeric codes, or combinations thereof, and the type generated is according to the request from the individual manufacturer.

3. The system according to claim 1, wherein the functionality for verifying authentication codes comprises;
comparing the authentication codes received in requests from the third parties with the original authentication codes to verify authenticity of the received articles; and
providing to the requesting third parties verification of authenticity of the articles or failure of verification.

4. The system according to claim 3, wherein authentication codes verified are deactivated, preventing re-use of the same code for other articles.

5. The system according to claim 3, wherein the information regarding the articles comprises one or more of routing information, place of delivery, details of the product, manufacturing details, and warranty information, and the functionality for verifying sends the information regarding the articles to the third party after product verification.

6. An authentication and tracking method, comprising the steps of:
(a) receiving by a network-connected server having a communication interface to individual ones of a plurality of manufacturers of articles, a request for authentication codes from an individual one of the plurality of manufacturers via the communication interface, the request specifying quantity of authentication codes to generate and information regarding the articles for which the authentication codes will be used;

(b) assigning by the server a master batch code associated with the authentication codes to be generated in response to the request;

(c) generating the quantity of authentication codes associated with the master batch code, the generated authentication codes comprising the information regarding the articles for which the codes will be used;

(d) transmitting the generated authentication codes to the individual manufacturer to be applied to the articles;

(e) maintaining the authentication codes generated as inactive until a further request from the individual manufacturer is received, the further request including the associated master batch code, wherein the codes are made active.

7. The method according to claim 6, wherein the authentication codes are picture codes, Semacodes, voice codes, barcodes or alpha-numeric codes, or combinations thereof, and the type generated is according to the request from the individual manufacturer.

8. The method according to claim 6 wherein, in response to requests from third parties, codes provided by the third parties are compared with original authentication codes to verify authenticity of received articles, and verification or failure is reported to the requesting third parties.

9. The method according to claim 8, wherein authentication codes verified are deactivated, preventing re-use of the same code for other articles.

10. The method according to claim 8, wherein the information regarding the articles comprises one or more of routing information, place of delivery, details of the product, manufacturing details, and warranty information, and the information is provided to the third party after product verification.

11. The method of claim 6 further comprising a step for the individual manufacturer to affix activated authentication codes to articles to be shipped.

12. The method of claim 11 wherein, in affixing the authentication codes, the manufacturer applies the codes to the articles in a manner to obscure the codes.

13. The method of claim 12 wherein the authentication codes are applied to the articles as tags with the codes hidden.

14. The method of claim 13 wherein the codes are hidden by covering the codes with a layer of material which may be subsequently peeled or scratched away.

* * * * *